(12) United States Patent
Parthasarathy et al.

(10) Patent No.: US 10,855,635 B2
(45) Date of Patent: Dec. 1, 2020

(54) ELECTRONIC MAIL (E-MAIL) SYSTEM SUPPORT FOR MESSAGES WITH DIFFERENT TRAFFIC TYPES

(71) Applicant: Microsoft Technology Licensing, LLC, Redmond, WA (US)

(72) Inventors: Krishna Kumar Parthasarathy, Redmond, WA (US); Wayne M. Cranston, Sammamish, WA (US); William J. Whalen, Kirkland, WA (US); Neelamadhaba Mahapatro, Bellevue, WA (US); Wilbert De Graaf, Bellevue, WA (US); Piyush Gupta, Bothell, WA (US); Victor Lee, Seattle, WA (US); Mingfeng Xiong, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 89 days.

(21) Appl. No.: 15/350,666

(22) Filed: Nov. 14, 2016

(65) Prior Publication Data
US 2018/0139161 A1    May 17, 2018

(51) Int. Cl.
*H04L 12/58*    (2006.01)

(52) U.S. Cl.
CPC .............. *H04L 51/14* (2013.01); *H04L 51/12* (2013.01)

(58) Field of Classification Search
CPC ......... H04L 51/04; H04L 51/14; H04L 67/10; H04L 67/16; H04L 51/12; H04L 67/28; H04L 67/2819; H04L 67/2838; H04L 67/38; H04L 67/2895; H04L 69/329
See application file for complete search history.

(56) References Cited

U.S. PATENT DOCUMENTS

| | | | |
|---|---|---|---|
| 6,691,156 B1 | 2/2004 | Drummond et al. | |
| 6,941,304 B2 | 9/2005 | Gainey et al. | |
| 7,146,402 B2 | 12/2006 | Kucherawy | |
| 7,543,053 B2 * | 6/2009 | Goodman | G06Q 10/107 709/206 |
| 7,568,008 B2 | 7/2009 | Jain et al. | |
| 7,640,589 B1 | 12/2009 | Mashevsky et al. | |
| 7,664,819 B2 | 2/2010 | Murphy et al. | |
| 7,685,303 B2 * | 3/2010 | Mevissen | G06F 9/465 370/254 |
| 7,730,094 B2 | 6/2010 | Kaler et al. | |
| 7,730,142 B2 | 6/2010 | LeVasseur et al. | |
| 7,836,139 B1 | 11/2010 | Gilbert et al. | |
| 7,873,695 B2 * | 1/2011 | Clegg | H04L 51/12 709/206 |
| 7,921,173 B2 | 4/2011 | Atkinson et al. | |
| 8,185,598 B1 | 5/2012 | Golovin et al. | |

(Continued)

OTHER PUBLICATIONS

"How Message Archiving Captures Email Messages", Published on: Dec. 26, 2013 Available at: http://www.google.com/support/enterprise/static/postini/docs/admin/en/arch_admin/intro_email_flow.html#990357.

*Primary Examiner* — Todd L Barker
(74) *Attorney, Agent, or Firm* — Christopher J. Volkmann; Kelly, Holt & Christenson, PLLC

(57) ABSTRACT

An electronic mail (email) message is received at in email transport infrastructure and has a traffic type identifier identifying a traffic type. Function processing logic in the email transport infrastructure conditionally processes the email message based on the traffic type.

19 Claims, 11 Drawing Sheets

(56) References Cited

U.S. PATENT DOCUMENTS

| | | | |
|---|---|---|---|
| 9,524,334 B2 * | 12/2016 | Wilson | H04L 51/12 |
| 9,824,332 B1 * | 11/2017 | Everton | G06Q 10/107 |
| 2004/0006638 A1 * | 1/2004 | Oberlander | H04L 51/063 |
| | | | 709/232 |
| 2004/0059789 A1 | 3/2004 | Shum | |
| 2005/0182960 A1 | 8/2005 | Petry et al. | |
| 2006/0075055 A1 * | 4/2006 | Littlefield | H04L 51/04 |
| | | | 709/206 |
| 2006/0224673 A1 | 10/2006 | Stern et al. | |
| 2007/0226311 A1 * | 9/2007 | Kaarela | H04L 12/2827 |
| | | | 709/217 |
| 2010/0318613 A1 * | 12/2010 | Souza | G06Q 10/107 |
| | | | 709/206 |
| 2011/0295925 A1 * | 12/2011 | Lieblich | G06F 9/5027 |
| | | | 709/202 |
| 2013/0173539 A1 * | 7/2013 | Gilder | G06F 16/273 |
| | | | 707/622 |
| 2013/0275463 A1 * | 10/2013 | Wilson | H04L 51/12 |
| | | | 707/769 |
| 2014/0330913 A1 * | 11/2014 | Pascal | H04L 51/16 |
| | | | 709/206 |
| 2014/0335823 A1 * | 11/2014 | Heredia | H04L 51/38 |
| | | | 455/411 |
| 2015/0095800 A1 * | 4/2015 | Koppes | H04L 51/00 |
| | | | 715/752 |
| 2016/0021152 A1 * | 1/2016 | Maguire | G06F 16/5866 |
| | | | 709/204 |
| 2016/0088095 A1 * | 3/2016 | Tran | H04L 67/10 |
| | | | 709/203 |
| 2016/0098323 A1 * | 4/2016 | Mutha | G06F 11/1402 |
| | | | 707/654 |
| 2016/0127323 A1 * | 5/2016 | Antonakakis | H04L 63/04 |
| | | | 726/3 |
| 2016/0269333 A1 * | 9/2016 | Kumar | H04L 51/16 |
| 2016/0306812 A1 * | 10/2016 | McHenry | G06Q 10/10 |
| 2018/0054450 A1 * | 2/2018 | Chao | H04L 63/1441 |
| 2018/0091401 A1 * | 3/2018 | Richards | H04L 67/36 |

* cited by examiner

ELECTRONIC MAIL (E-MAIL) SYSTEM SUPPORT FOR MESSAGES WITH DIFFERENT TRAFFIC TYPES

BACKGROUND

Computing systems are currently in wide use. Some computing systems include electronic mail (e-mail) computing systems that allow users to perform a variety of different types of electronic mail operations.

For example, e-mail systems allow users to author and send e-mail messages to different recipients. They allow users to receive and view e-mail messages, arrange folders in the e-mail system, configure filters and rules, among a wide variety of other things.

E-mail systems have a transport infrastructure that allows the transmission of messages using simple mail transfer protocol (SMTP). The transport infrastructure often supports client computing systems that can be used by users to interact with the e-mail system. The client computing systems can be used to generate a message, for transmission to one or more recipients, that is then placed in an outbox for a user. In the transport infrastructure, a submission service transmits the message from the sender's mailbox to a hub server which identifies the destination of the recipients. It can then transfer the message to a delivery service which places the message in an inbox for the recipient, or transfer the message to another email system which then delivers the message further.

The transport infrastructure in an electronic mail system also provides a variety of different functions, automatically. For instance, it has retry logic that periodically or intermittently tries to resend messages that may not have been successfully sent. It has a queuing mechanism that queues messages to be sent. The queuing mechanism can consider a priority assigned to e-mail messages. The queuing is also often done on an asynchronous basis. Such systems also generally provide redundancy which improves the reliability of the system. The systems are also configured to scale relatively well.

The discussion above is merely provided for general background information and is not intended to be used as an aid in determining the scope of the claimed subject matter.

SUMMARY

An electronic mail (email) message is received at in email transport infrastructure and has a traffic type identifier identifying a traffic type. Function processing logic in the email transport infrastructure conditionally processes the email message based on the traffic type.

A control flow message is automatically generated and is processed by an email system. The control flow message includes per-user, non-email information, but uses the email transport infrastructure to obtain the reliability corresponding to that infrastructure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
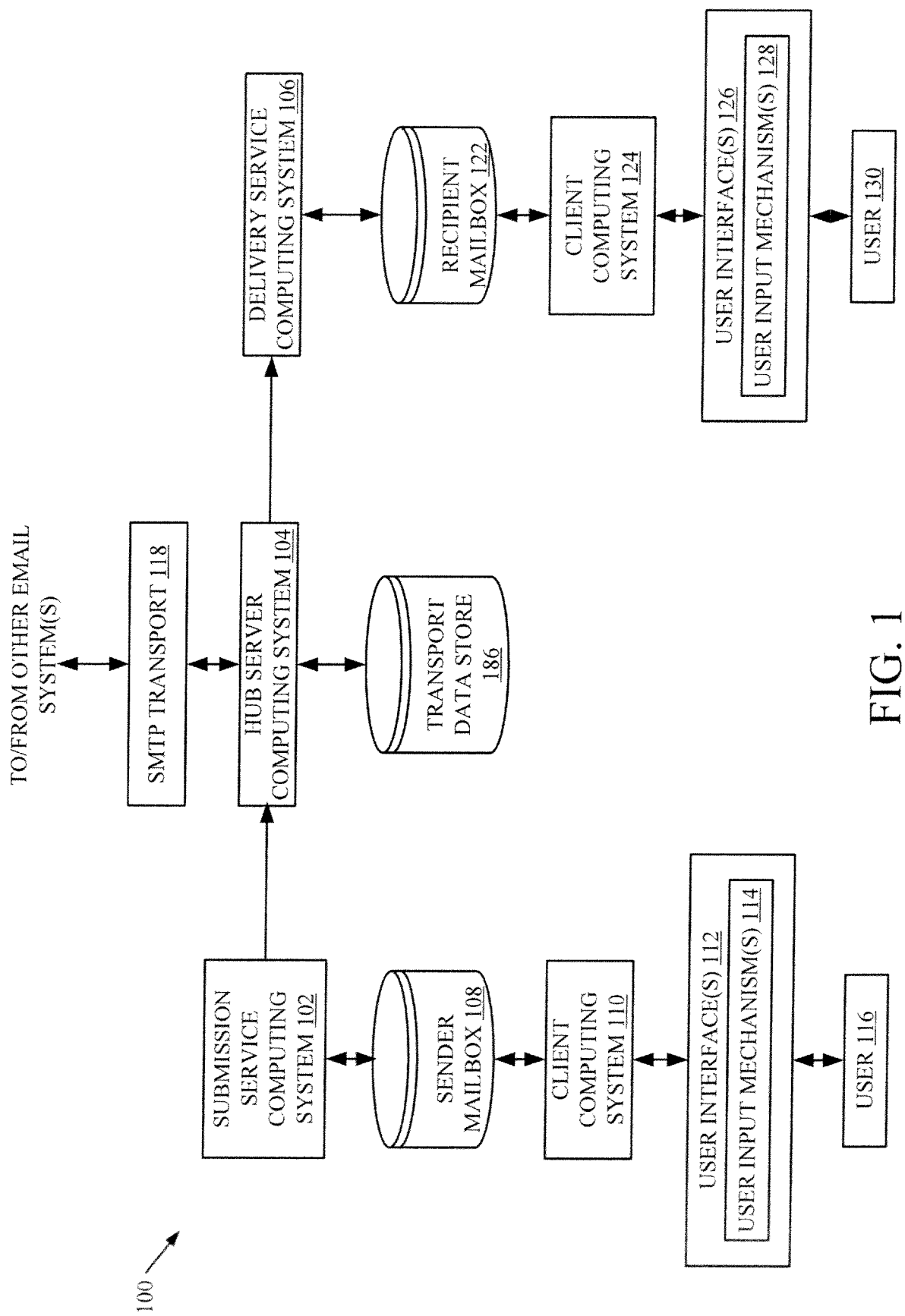
FIG. 1 is a block diagram of on example of an electronic mail (email) system architecture.

FIG. 1 is a block diagram of one example of an electronic mail (e-mail) system architecture 100. Architecture 100 includes an e-mail infrastructure that, itself, includes submission service computing system 102, hub server computing system 104, and delivery service computing system 106. Submission service computing system 102, in the example shown in FIG. 1, has access to sender mailbox 108 that can have messages generated and placed therein, for being sent to a recipient, by client computing system 110.

Client computing system 110, itself, illustratively generates user interfaces 112 with user input mechanisms 114 for interaction by user 116. User 116 interacts with user input mechanisms 114 in order to control and manipulate client computing system 110, and to send messages through the e-mail system infrastructure.

When user 116 composes and sends an e-mail, it can be placed in the sender's outbox (in mailbox 108) and accessed by submission service computing system 102. System 102 illustratively sends the message to hub server computing system 104. Hub server computing system 104 (which has access to transport data store 186) illustratively identifies the destination (or recipient) of the e-mail message and sends it, to an appropriate delivery service computing system 106 that can deliver the message to the recipient's inbox (in mailbox by 122 in FIG. 1). If one or more of the recipients is outside the email system, the hub server computing system 104 can also send the message to one or more external email systems using SMTP transport 118. In addition, a new message can be received within the email system from one or more external email systems through SMTP transport 118. Hub server computing system 104 can then send them to the delivery server for the recipients within the email system.

Client computing system 124 illustratively generates user interfaces 126 with user input mechanisms 128 for interaction by user 130. When user 130 is the recipient of an e-mail message, user 130 can interact with user input mechanisms 128 in order to control and manipulate client computing system 124 to access messages through the recipient's mailbox 122, and to otherwise control and manipulate client computing system 124 and the e-mail transport infrastructure.

Figure 2A:
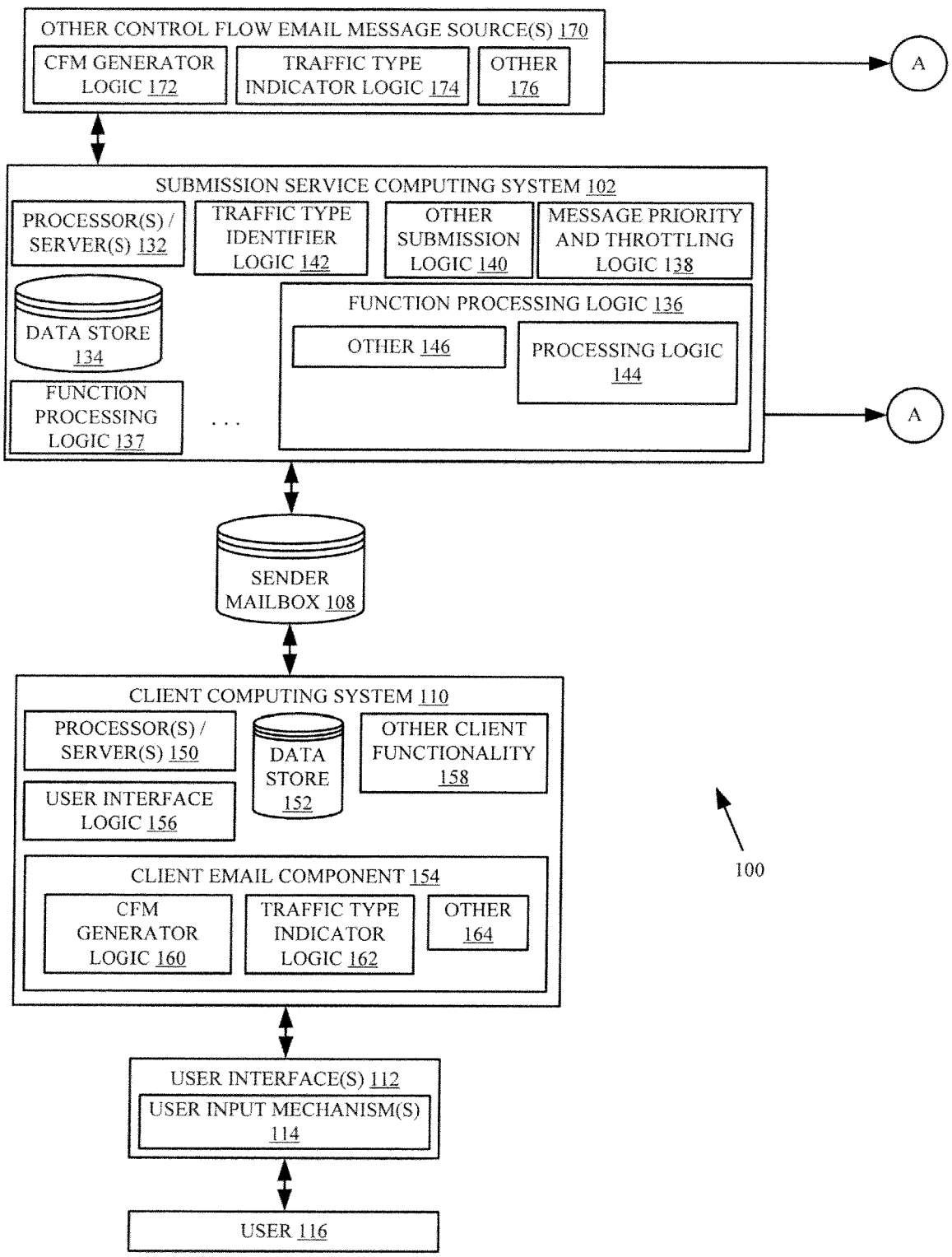
FIGS. 2A and 2B (collectively referred to herein as FIG. 2) show a block diagram illustrating one example of the electronic mail (e-mail) system architecture in more detail.
Figure 2B:
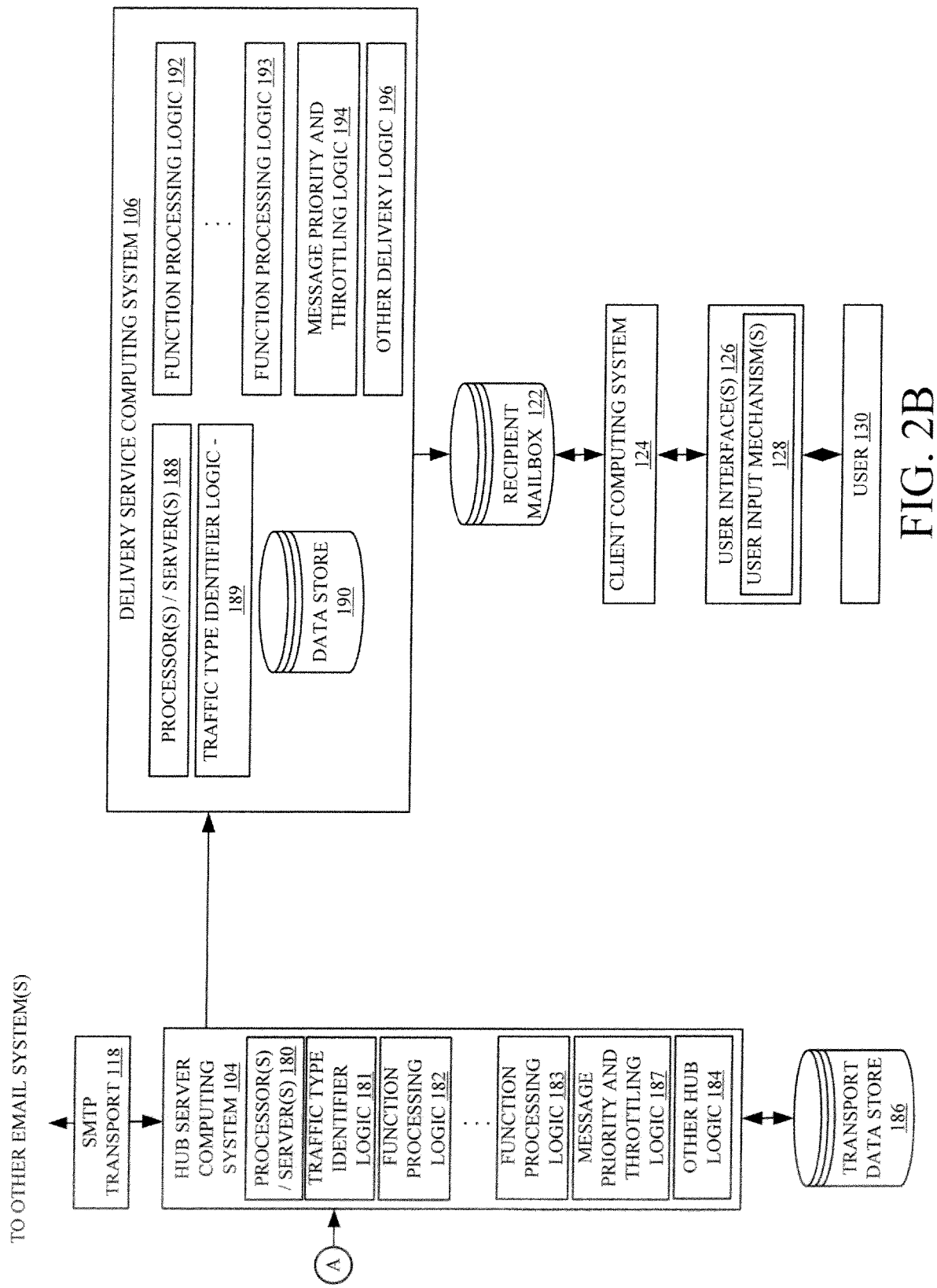

Before describing the overall operation of computing system architecture 100 in more detail, a brief description of some of the items in architecture 100, and their operation, will first be provided. FIGS. 2A and 2B (collectively referred to herein as FIG. 2) show one example of a more detailed block diagram of architecture 100. In the example shown in FIG. 2, submission service computing system 102 can include one or more processors or servers 132, data store 134, one or more items of function processing logic 136-137, message priority and throttling logic 138, traffic type identifier logic 142 and it can include a wide variety of other submission logic 140. Each item of function processing logic 136-137, itself, can include processing logic 144, and it can include other items 146.

In one example, the various messages that can be generated in architecture 100 can have different traffic types (and subtype). It will be noted that, in the present discussion, a traffic type or subtype may be referred to. It will be appreciated that the messages may only have a traffic type. They may also have a subtype, or more deeply nested type, such as a sub-subtype. All of these are contemplated herein and those mentioned are mentioned by way of example only.

For instance, one traffic type may be a consumer e-mail message. Another message may be an enterprise message. These two types of messages may be differentiated by the corresponding traffic type/subtype. These different email messages may need to be processed in different ways. For instance, an enterprise email message may need to trigger organization-based policies, while a consumer email message may not. Therefore, different items of function processing logic can be invoked for these different messages, to process them differently, based on their traffic type/subtype. In this example, it may be that both of these email messages have the same traffic type, but are distinguished from one another, based on their subtypes.

In accordance with one example, any single email message has only a single traffic type (and possibly subtype). The function processing agents 136-137 may be configured to process more than one type or subtype of message. The items of function processing logic 136-137 can be selectively invoked to process the email messages based on their traffic type (and possibly subtype).

By way of example, one additional traffic type will be referred to herein as a control flow message (CFM) traffic type. A control flow message is a message that has instructions and or data (and hence is not experienced as an email message by the user) to enable a variety of scenarios outside of normal email, and, as described below, some of these scenarios are not even email-related scenarios. However, the messages are sent using the email transport infrastructure because it provides highly reliable queueing and delivery for per user, non-email data. CFMs can be automatically generated based upon a user action, or based upon other system actions. Some of these are described in greater detail below. Suffice it to say, for now, that control flow messages are, in one example, never seen by users 116 and 130 who use the e-mail computing system architecture 100. Instead, those messages can be used as instructions by function processing logic 136-137 to take some action. They are not delivered to a user's inbox.

In one example, each item of function processing logic 136-137 can subscribe to (or otherwise opt to) receive e-mail messages having one or more different traffic types (and possibly subtypes), and can perform processing steps based upon those messages, when they are received. Traffic type identifier logic 142 identifies the traffic type (and possibly subtype) corresponding to an e-mail message that is received by submission service computing system 102. If it is one that one of the items of function processing logic 136-137 has subscribed to (or otherwise opted to receive), then the particular function processing logic 136-137 that has subscribed to it will receive the email message and process it. In processing the email message, the conditional processing logic 144 can perform processing steps based upon the information in the e-mail message. This can take a wide variety of different forms. For instance, it may perform actions on data in the user's mailbox. It may access a social graph corresponding to the user and act on, or interact with, information in the user's social graph. It may perform a wide variety of other actions as well. Those mentioned are mentioned by way of example only.

It will be noted that, as described herein, each item of function processing logic 136-137 may perform a different function and may "subscribe" to receive email messages of one or more different traffic types and subtypes. However, a subscription process may not be needed. Instead, it may be that function type identifier logic 142 reads the type and subtype of a message and accesses a mapping between that type and subtype and the various items of function processing logic that are to receive messages of that type and subtype. Other ways of determining which items of function processing logic are to receive the messages can be used as well.

Message priority and throttling logic 138 can also interact with the e-mail based upon its traffic type. For instance, it may be that urgent e-mail messages are given highest priority, while control flow messages (or messages having other traffic types or subtypes) are given lowest priority. Similarly, where a user's e-mail account is experiencing relatively heavy usage, then logic 144 may discontinue processing control flow messages until the e-mail messages having a normal email traffic type (regardless of their priority) have already been dealt with and the traffic is at a lower level. All of these are examples only.

In the example illustrated in FIG. 2, client computing system 110 can also include one or more processors or servers 150, data store 152, client e-mail component 154, user interface logic 156, and it can include a wide variety of other client functionality 158. Client e-mail component 154 can be a client component of the e-mail service that is serviced by e-mail system architecture 100. In one example, it can include CFM generator logic 160 that can generate control flow messages or messages of other traffic types and subtypes. It will be appreciated that the items of function processing logic can process any of a variety of email messages having any different traffic types or subtypes. The present description will proceed with respect to only two traffic types, normal email and control flow messages, and some examples will refer to control flow messages having different subtypes (such as an anti-spam subtype, a social graph subtype, etc.). However, this is by way of example only, and many other examples of different traffic types and subtypes can be used.

Component 154 also illustratively includes traffic type indicator logic 162 that can generate an indicator indicating that the generated message has a particular traffic type and subtype. Client e-mail component 154 can include a wide variety of other items 164 as well.

User interface logic 156 can, itself, or under the control of other items, generate user interfaces 112. It can also generate, and detect interaction with, user input mechanisms 114 and communicate those interactions with other items as well.

Also, in the example shown in FIG. 2, submission service computing system 102 is illustrated receiving control flow messages from other control flow message sources 170. The other control flow message sources 170 and can be a variety of different sources (some of which are described below)

illustratively include CFM generator logic 172, traffic type indicator logic 174, and other items 176. These illustratively function in a similar way to logic 160, 162, and other items 164 described above. Of course, they can generate control flow messages in other ways as well.

Hub server computing system 104, in the infrastructure illustrated in FIG. 1, can include one or more processors or servers 180, traffic type identifier logic 181, one or more items of function processing logic 182-183, message priority and throttling logic 186 and other hub logic 184. It is shown accessing transport data store 187 as well. Traffic type identifier logic 181 can be similar to logic 142 described above. It detects (e.g., reads) the traffic type and subtype of email messages and selectively invokes items of function processing logic 182-183 that are to process them. The items of function processing logic 182-183 can be similar to logic 136-137, described above with respect to submission service computing system 102, or they can be different. They can subscribe to (or opt to receive and act upon) e-mail messages having a variety of different e-mail traffic types and subtypes. They can perform conditional processing steps based upon those messages, when they are received, as described above. Logic 186 can be similar to logic 138 described above with respect to computing system 102, or different.

It will be noted that the present system can be backward compatible and extensible. Some messages may not have a traffic type or subtype. Thus, they are treated as regular email. All existing items of function processing logic do not need to be updated in order to keep the system working for regular (normal) email. Rather, as new traffic types are added, new agents (or items of function procession logic) can be added that explicitly understand them and then existing agents are updated to include them.

FIG. 2 also shows that, in one example, delivery service computing system 106 can include one or more processors or servers 188, traffic type identifier logic 189, data store 190, items of function processing logic 192-193, message priority and throttling logic 194, and it can include a wide variety of other delivery logic 196. Traffic type identifier logic 189 can be similar to logic 142 and 181 described above, or different. It illustratively determines which traffic type and subtype a received email message is and provides it to items of logic 192-193 that are to receive it. Function processing logic 192-193 can be similar to logic 182-183 described above, or they can be different. They can perform the same or different types of conditional processing steps based on the same or different traffic types and subtypes of e-mail messages that it receives as well. Message priority and throttling logic 194 can be similar to logic 186 and logic 138 described above, or it can be different.

It will also be noted that, in one example, client computing systems 110 and 124 can be similar systems, or they can be different. It will be assumed for the sake of the present discussion, that they are similar systems. Therefore, only client computing system 110 is described herein in more detail.

Figure 2C:
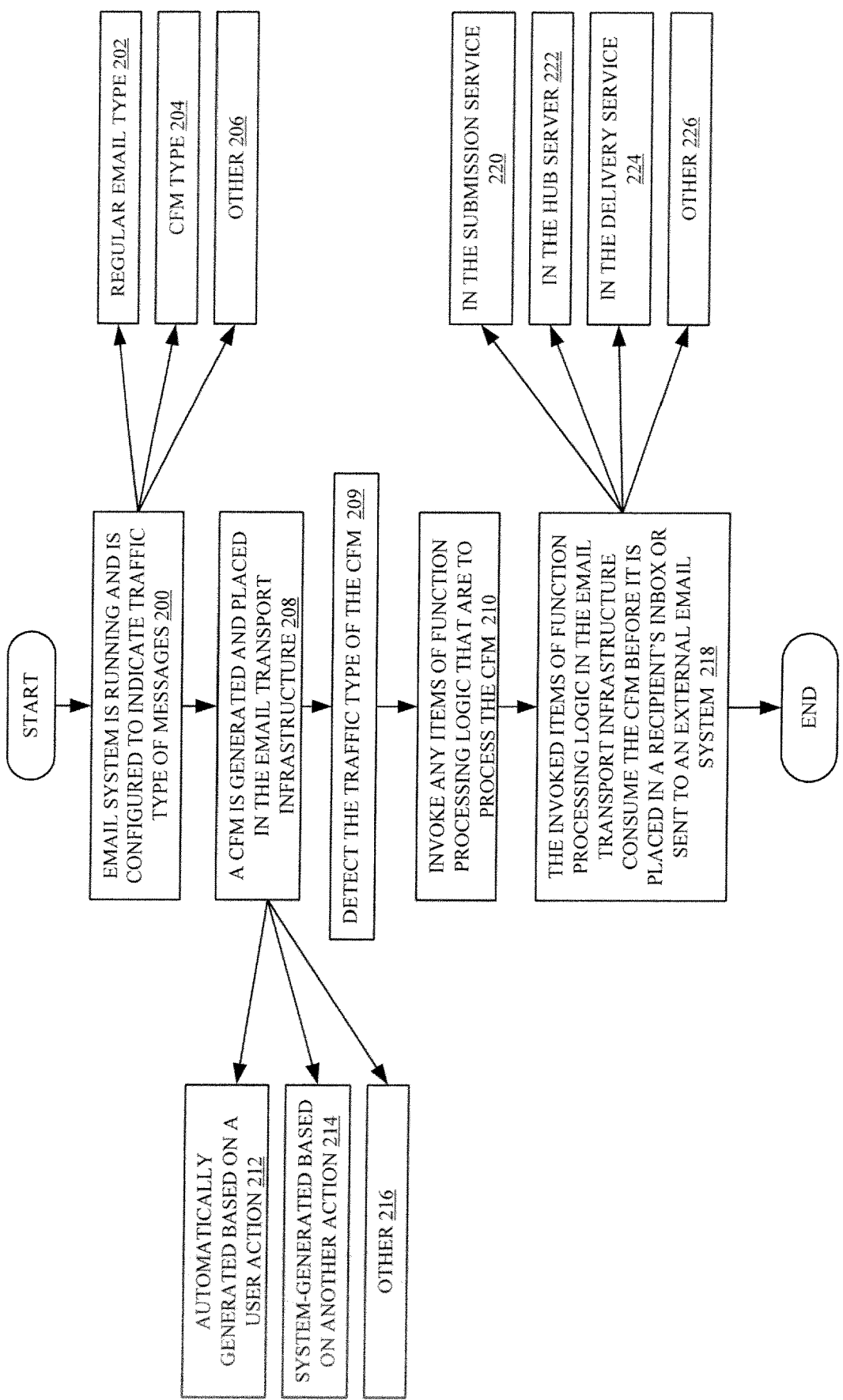
FIG. 2C is a flow diagram illustrating one example of the operation of the architecture shown in FIG. 1 in handling e-mail messages having different traffic types.

FIG. 2C is a flow diagram illustrating one example of the operation of architecture 100, shown in FIGS. 1 and 2, in handling an e-mail message that has a traffic type that is something other than a conventional e-mail message. For the purposes of the present example, it is assumed that the traffic type is a control flow message but the same description can be used for messages of other traffic types and subtypes. FIGS. 1-2C will now be described in conjunction with one another.

It is first assumed that the e-mail system architecture 100 is running, and that the various systems in the e-mail system transport infrastructure are configured to identify the traffic type of e-mail messages that are received, regardless of where they are generated. That is, if a client computing system 100 generates an e-mail message having a control flow message traffic type, or any other traffic type beyond normal email, that will be detected by the infrastructure of e-mail system architecture 100. Similarly, if any other control flow message source 170 generates an e-mail message having a control flow message traffic type, that will also be detected by the systems in the e-mail transport infrastructure shown in FIG. 2. Having the e-mail system running and configured to detect the traffic types of the various e-mail messages is indicated by block 200 in the flow diagram of FIG. 2C. Again, the traffic types may be regular e-mail types 202, control flow message types 204, or they can be a wide variety of other traffic types or subtypes, etc. This is indicated by block 206.

At some point, an e-mail message having a traffic type other than a regular e-mail traffic type (such as a control flow message type) will be generated and placed somewhere in the e-mail transport infrastructure illustrated in FIG. 1. This is indicated by block 208 in the flow diagram of FIG. 2C. The email messages may be automatically generated based on a user action (that is, the user may perform some action and the system automatically generates the message, without bringing it to the attention of the user) as indicated by block 212, or they may be system-generated messages that are based on another action (such as a system action or another action) as indicated by block 214. They can be generated in other ways as well, and this is indicated by block 216.

By way of example, assume that user 116 has opened a collaborative document that is being worked on by users 116 and 130. Assume also that user 116 has provided a social graph input indicating that the user "likes" the document. The document management system (which may be one of the other control flow message sources 170) illustratively generates a control flow message indicating this user action. The message is from the person that did the "liking" to the person whose document was "liked". It identifies the control flow message as having a control flow traffic type, and it provides it to submission service computing system 102 (either through the outbox in mailbox 108 of user 116, or in another way), which provides it to hub-server computing system 104. The message gets passed on from hub-server computing system 104 to the delivery service computing system 106 for the recipient where an item of function processing logic is invoked, which updates the social graph for the document owner to show that the other user liked the document.

Similarly, a system-generated message may be generated by a message source 170 based on a spam processor identifying that a particular e-mail message that has already been sent to one of the users has a spam signature that was not previously detected. In that case, the spam processor can generate a control flow message indicating that the already-sent message has the spam signature, and indicating that it should be moved to the user's trash, if it has not already been read. This message can be sent to hub server computing system 104 and then to the delivery service computing system 106 for the user who originally received the spam message. An item of function processing logic moves the message from the inbox to trash. These are only two examples of control flow messages that can be automatically generated based on a user action, or generated based upon a system action. A wide variety of others can be generated as well. By automatically it is meant that the message is generated without a user input specifically generating it. The user action is instead another type of user input and the control flow email message is automatically generated.

Once the control flow message is generated and placed on a system (or role) in the e-mail transport infrastructure, that system or role detects the traffic type of the CFM as indicated by block 209 and invokes any items of function processing logic on that system (or role) that are to receive messages of that traffic type, so they can process the message. This is indicated by block 210. The invoked item(s) of function processing logic illustratively consume the control flow message, before it is placed in a recipient's inbox, or is sent to another email system. This is indicated by block 218 in the flow diagram of FIG. 2C. Again, in the description of FIG. 2C, the message has a control flow message traffic type. For other traffic types or subtypes, the message may be delivered to the recipient's inbox and displayed to the recipient. A CFM is just one example. It will be noted that the steps of identifying the traffic type of the message, invoking function processing logic, and having the invoked logic process the message can happen on each of the systems or roles in the email transport infrastructure, such as on submission service computing system 102. This is indicated by block 220 in the flow diagram of FIG. 2C. It can be done on the hub server computing system 104. This is indicated by block 222. It can be done on the delivery service computing system 106. This is indicated by block 224 in the flow diagram of FIG. 2C. It can be done elsewhere as well, and this is indicated by block 226.

Figure 3:
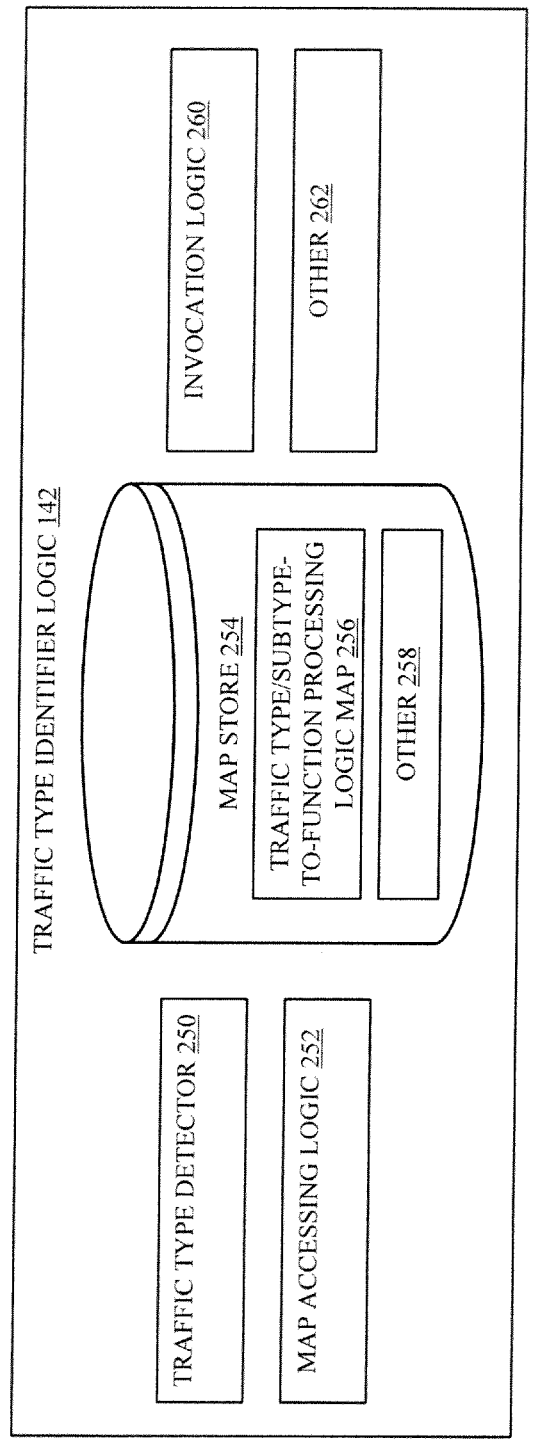
FIG. 3 is a block diagram showing one example of conditional processing logic in more detail.

FIG. 3 is a block diagram showing one example of traffic type identifier logic 142 in more detail. It will be noted that logic 142 can be the same as the logic 181 and 189 or it can be different. Also, the functions performed by logic 142 can be performed by logic that resides on each of the roles in the email transport infrastructure (such as on each of computing systems 102, 104 and 106) or it can be performed by logic that is remote from those roles and called by each role. Also, the functions performed by logic 142 can be performed by logic that resides on each of the roles in the email transport infrastructure (such as on each of computing systems 102, 104 and 106) or it can be performed by logic that is remote from those roles and called by each role.

FIG. 3 shows that, in one example, traffic type identifier logic 142 can include traffic type detector 250, map accessing logic 252, map store 254, invocation logic 260 and other items 262. Map store 254, itself, illustratively includes traffic type/subtype-to-function processing logic map 256, and it can store other items 258.

Traffic type detector 250 illustratively detects the traffic type/subtype of the email messages that are received. Map accessing logic 252 accesses map 256 to identify which particular items of function processing logic are to process messages of the detected type and invocation logic 260 invokes those items of logic so they can process the message.

Figure 4:
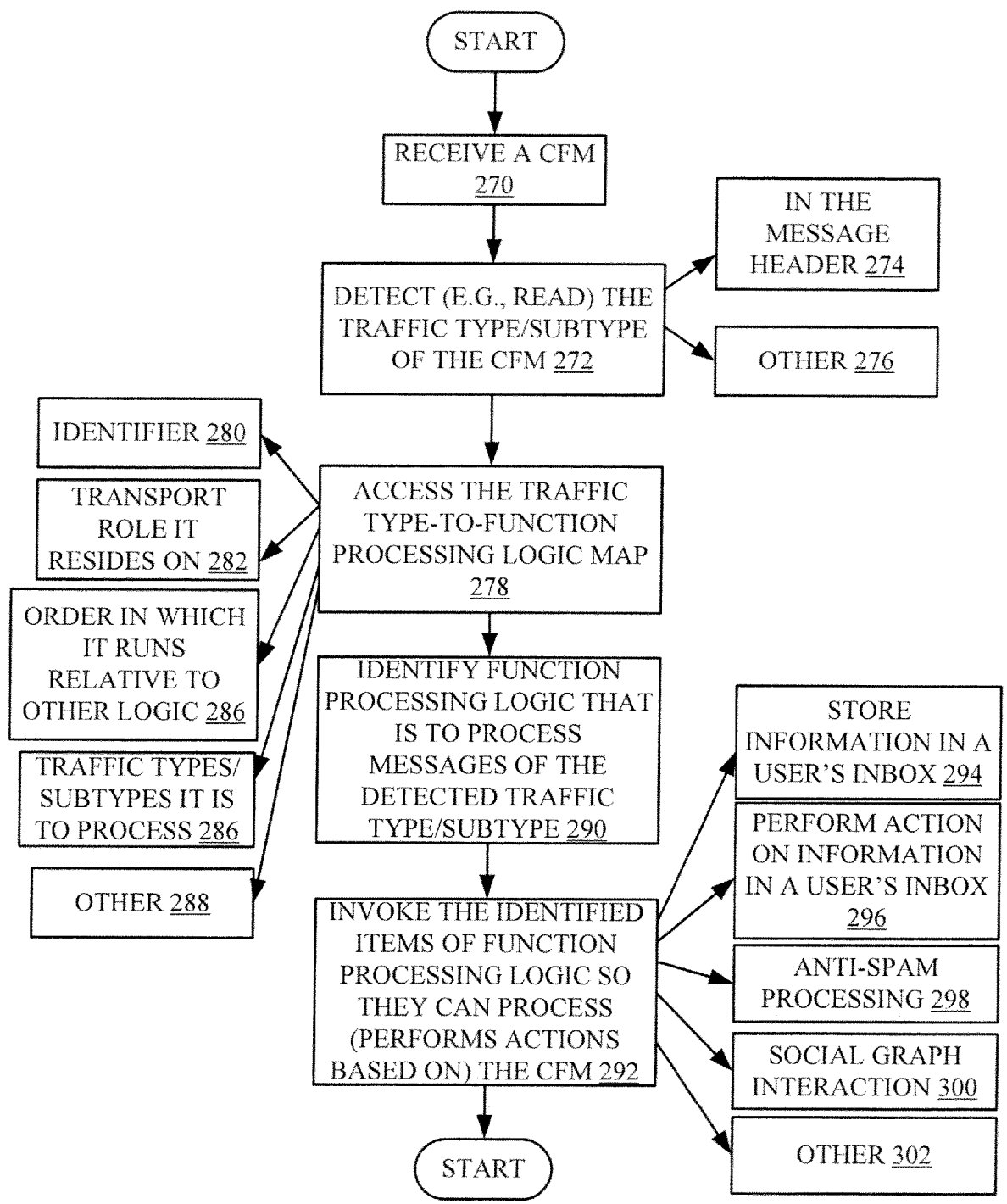
FIG. 4 is a flow diagram showing one example of the operation of the conditional processing logic, in more detail.

FIG. 4 is a flow diagram illustrating one example of the operation of traffic type identifier logic 142 in more detail. It is first assumed that logic 142 determines that a message has been received. This is indicated by block 270. Traffic type detector 250 then detects the traffic type/subtype of the received message. This is indicated by block 272. In one example, detector 250 reads the traffic type/subtype. In one example, that can be found in the message header. This is indicated by block 274. In another example, detector 250 can detect the traffic type in other ways. For instance, the system that generated the message can indicate to detector 250 what the traffic type/subtype is. Detecting the traffic type/subtype in other ways is indicated by block 276.

Map accessing logic 252 then accesses map 256. Map 256 can take a variety of different forms. For instance, it can have entries that identify the identifier (e.g., name) 280 of the function processing logic, along with the transport role 282 it resides on. It can identify the order 284 in which the logic is to be operate relative to other logic on the role, and it can include the traffic types/subtypes 286 that it is to process. It can include other or different items 288 as well.

Map accessing logic 252 identifies, based on map 256, which items of function processing logic are to be invoked for the detected traffic type/subtype corresponding to the message. This is indicated by block 290.

Invocation logic 260 then illustratively invoked each of the identified items of function processing logic, in the identified order, so they can process the message. This is indicated by block 292. The invoked logic can perform a wide variety of different operations based on the message. For instance, it can store information in a user's inbox, based on the message. This is indicated by block 294. It can perform an action on information in a user's mailbox. This is indicated by block 296. It can perform subsequent or remedial anti-spam processing to take remedial actions after prior spam processing decisions were already made, as indicated by block 298, social graph interactions, as indicated by block 300, or a wide variety of other processing, as indicated by block 302.

It will be noted that, while a CFM has been specifically described as a message of a particular traffic type, it can have various different subtypes, and still other types and subtypes, can be used as well. Some email messages can be identified as a particular traffic type/subtype based on a wide variety of different criteria, and conditional processing can be performed based on those traffic types and subtypes. While CFMS and the various subtypes are one example of using traffic type and subtypes, there are other examples as well.

For example, when a consumer message is generated, this can be detected and the message can be identified as a particular traffic type/subtype. Then, the function processing logic that is invoked to process messages of that type/subtype may implement different policies (if any), than if the message was an enterprise message.

In another example, messages generated by a user having a particular organizational role (such as a vice president) may be identified with a particular traffic type and/or subtype so they can be processed by an item of function processing logic in a special way.

Further, traffic type can be used to distinguish between consumer email and commercial email messages. They can be used to identify other special messages, such as journal/archive messages or others.

Again, these are only examples of how function processing logic can be conditionally invoked based on different examples of messages having different traffic types/subtypes. There are a wide variety of other functions that can be performed using traffic type/subtype to conditionally invoke processing logic.

It will thus be appreciated that the present discussion enables a wide variety of different scenarios where e-mail messages, having traffic types that are different than a normal e-mail message, can be sent using the e-mail transport infrastructure. These messages can be conditionally processed by a wide variety of different kinds of transport agents or other function processing logic, at different points in the e-mail transport infrastructure, to perform a wide variety of different tasks, based upon the traffic type/subtype. In addition, these e-mail messages derive the benefits of the e-mail transport infrastructure, such as asynchronous queuing, redundancy, high reliability and scalability, among other advantages.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
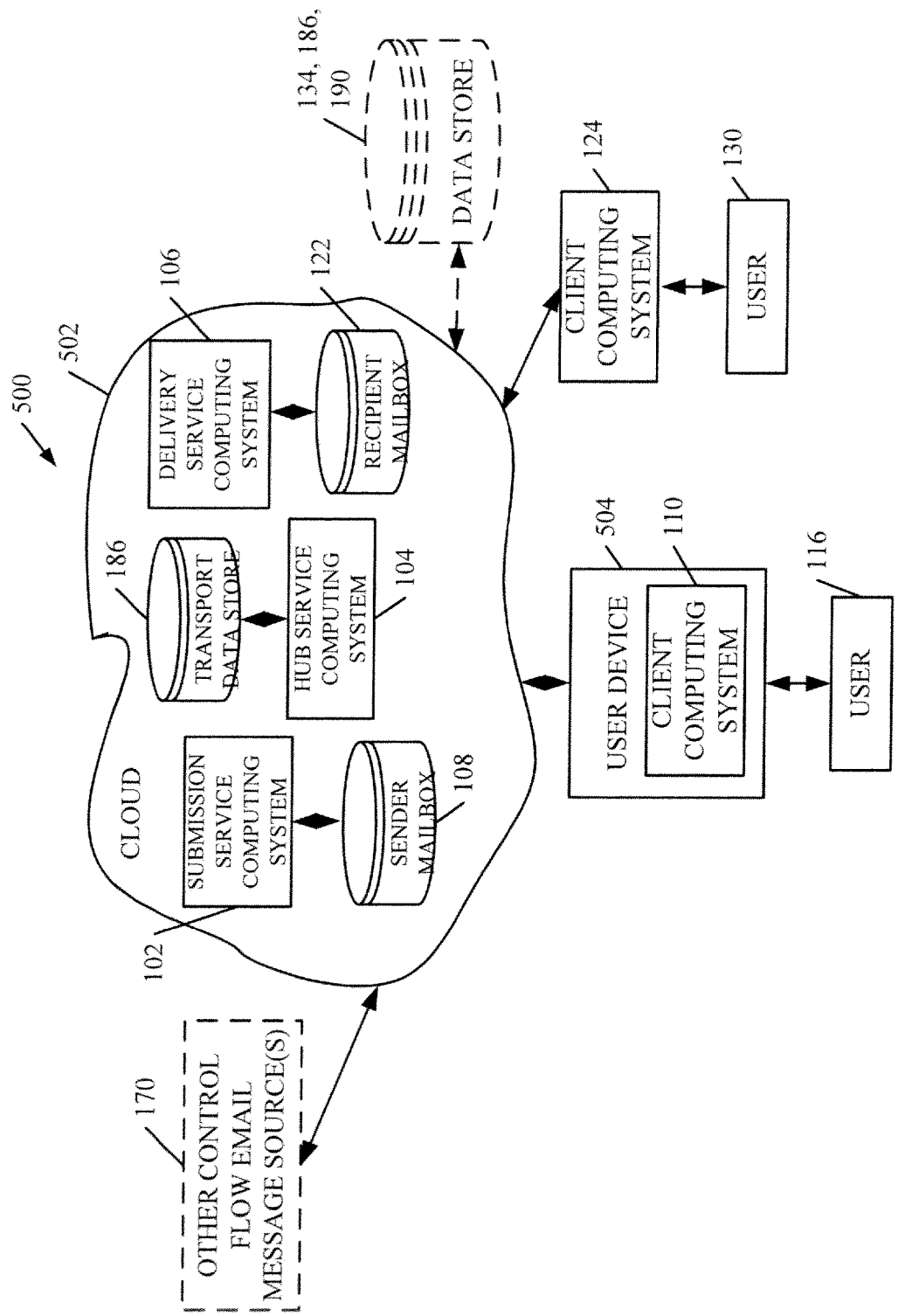
FIG. 5 is a block diagram illustrating the architecture shown in FIG. 1, deployed in a cloud computing architecture.

FIG. 5 is a block diagram of architecture 100, shown in FIG. 1, except that its elements are located in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 102, 104 and 106 and their data stores 108, 186, 122 can be located in cloud 502 (which can be public, private, or a combination where portions are public while others are private). Therefore, user 116 can use a user device 504 to access those systems through cloud 502.

FIG. 5 also depicts another example of a cloud architecture. FIG. 5 shows that it is also contemplated that some elements of architecture 100 can be disposed in cloud 502 while others are not. By way of example, data stores 134, 186, 190 (or others) can be disposed outside of cloud 502, and accessed through cloud 502. In another example, other control flow email message services 170 can be outside of cloud 502. Regardless of where they are located, they can be accessed directly by device 504 or other client systems, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
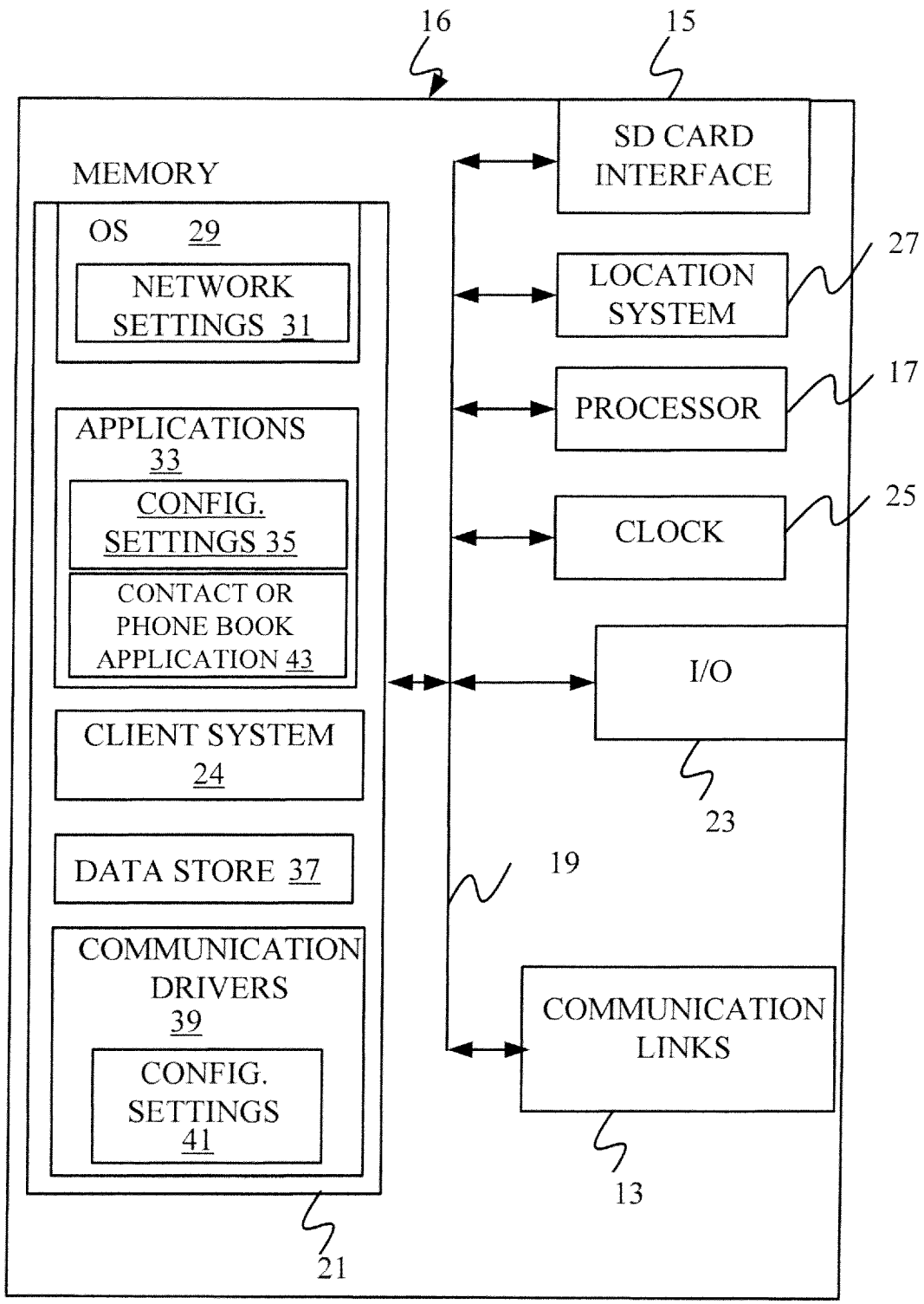
FIGS. 6-8 show examples of mobile devices that can be used in the architectures shown in the previous figures.
Figure 7:
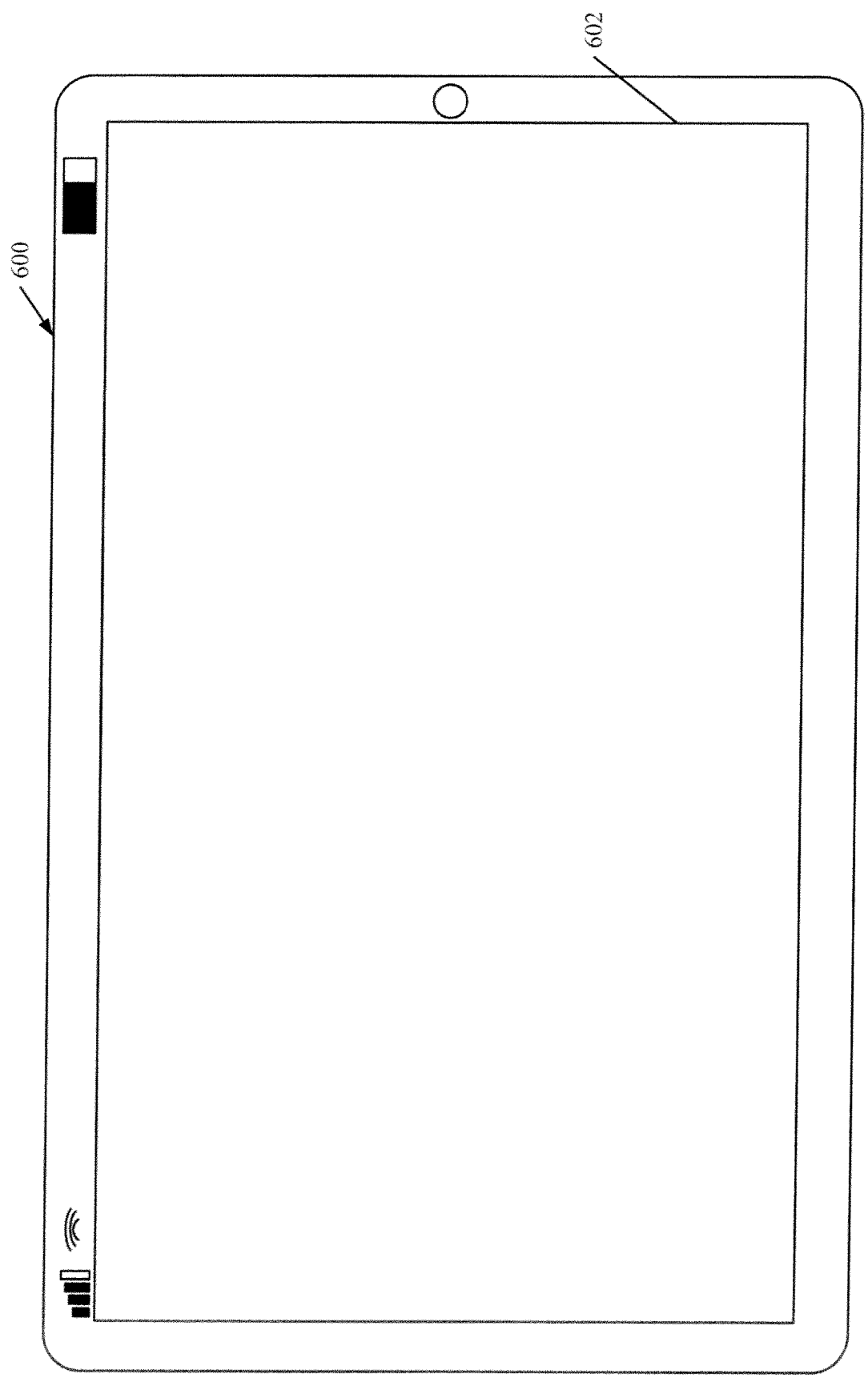
Figure 8:
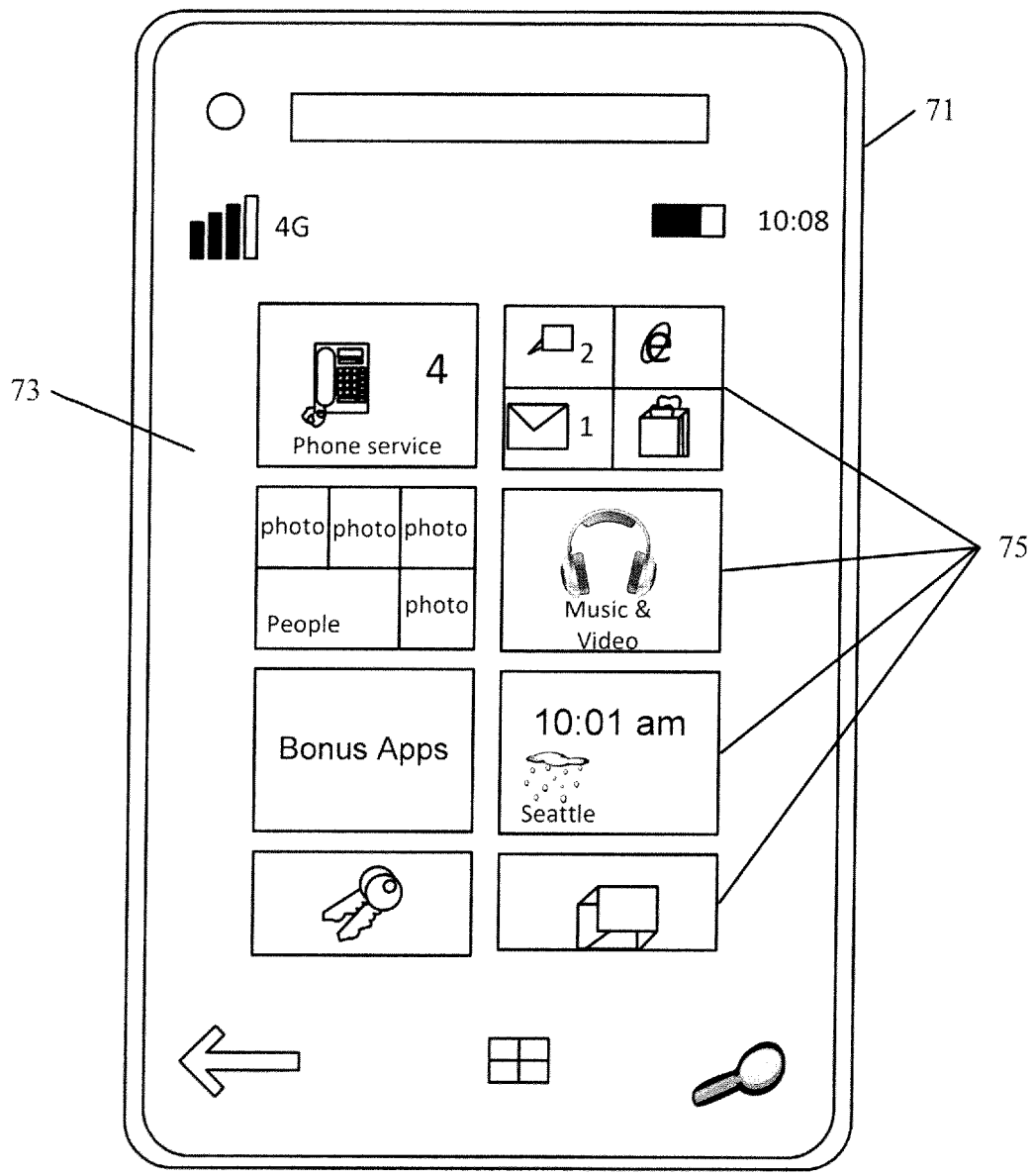

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 (such as the client system or other components) or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
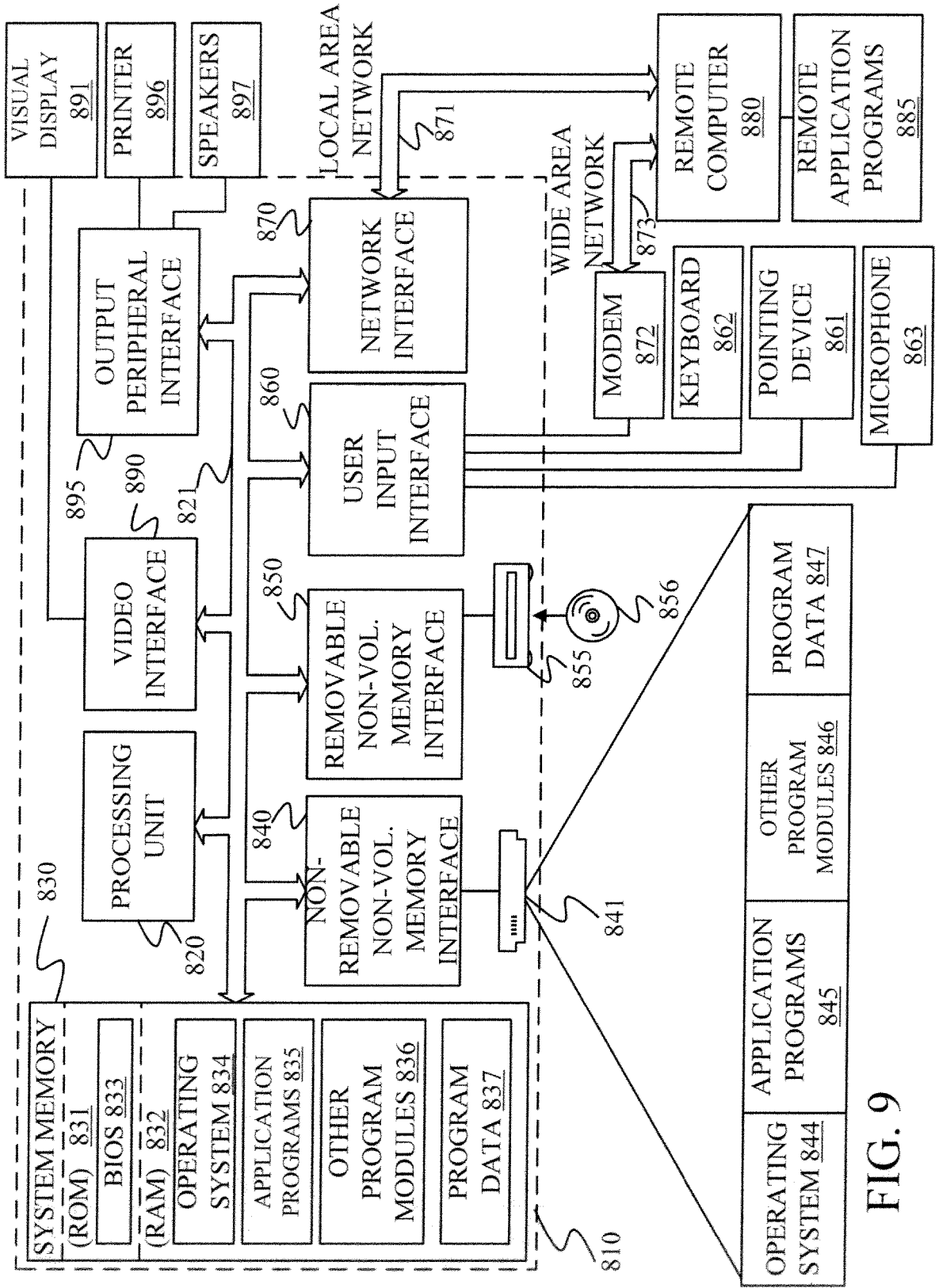
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
traffic type identifier logic that detects a traffic type, of a plurality of different traffic types, corresponding to an electronic mail (email) message in an email transport infrastructure;
function processing that is conditionally invoked to process the email message, based on the traffic type corresponding to the email message; and
invocation logic that selectively invokes the function processing logic based on the traffic type corresponding to the email message.

Example 2 is the computing system of any or all previous examples and further comprising:
map accessing logic that identifies the function processing logic to be invoked based on the traffic type corresponding to the email message.

Example 3 is the computing system of any or all previous examples and further comprising:
a map that maps the traffic type to the function processing logic, the map accessing logic identifying the function processing logic to be invoked by accessing the map, based on the traffic type corresponding to the email message.

Example 4 is the computing system of any or all previous examples and further comprising:
message priority logic that identifies a priority of the email message based on the detected traffic type corresponding to the email message.

Example 5 is the computing system of any or all previous examples wherein the function processing logic comprises:
storage logic configured to control a user inbox to store information in the user inbox.

Example 6 is the computing system of any or all previous examples wherein the function processing logic comprises:
action logic configured to control a user inbox to perform an action on information in the user inbox.

Example 7 is the computing system of any or all previous examples and further comprising:
a spam processor that identifies that the email message has a spam signature, after the email message is delivered to the user inbox, wherein, in response, the action logic controls the user inbox to move the email message from the user inbox to a trash folder.

Example 8 is the computing system of any or all previous examples wherein the email transport infrastructure comprises:
a submission service computing system, and wherein a plurality of items of function processing logic are disposed on the submission service computing system and are selectively invoked based on the traffic type corresponding to the email message.

Example 9 is the computing system of any or all previous examples wherein the email transport infrastructure comprises:
a hub server computing system, and wherein a plurality of items of function processing logic are disposed on the submission service computing system and are selectively invoked based on the traffic type corresponding to the email message.

Example 10 is the computing system of any or all previous examples wherein the email transport infrastructure comprises:
a delivery service computing system, and wherein a plurality of items of function processing logic are disposed on the submission service computing system and are selectively invoked based on the traffic type corresponding to the email message.

Example 11 is a computer implemented method, comprising:
detecting a traffic type, of a plurality of different traffic types, corresponding to an electronic mail (email) message in an email transport infrastructure;
selectively invoking function processing logic based on the traffic type corresponding to the email message; and
processing the email message with the function processing logic that is selectively invoked based on the traffic type corresponding to the email message.

Example 12 is the computer implemented method of any or all previous examples and further comprising:
identifying the function processing logic to be invoked by accessing a map that maps the traffic type to the function processing logic, based on the traffic type corresponding to the email message.

Example 13 is the computer implemented method of any or all previous examples and further comprising:
identifying a priority of the email message based on the detected traffic type corresponding to the email message.

Example 14 is the computer implemented method of any or all previous examples wherein processing the received email message comprises:
controlling a user inbox to store information in the user inbox.

Example 15 is the computer implemented method of any or all previous examples wherein processing the received email message comprises:
controlling a user inbox to perform an action on information in the user inbox.

Example 16 is the computer implemented method of any or all previous examples and further comprising:

identifying that the email message has a spam signature, after the email message is delivered to the user inbox, wherein, in response, controlling a user inbox comprises controlling the user inbox to move the email message from the user inbox to a trash folder.

Example 17 is a computing system, comprising:
traffic type identifier logic that detects a traffic type, of a plurality of different traffic types, corresponding to a received electronic mail (email) message in an email transport infrastructure;
function processing that is conditionally invoked to process the received email message, based on the traffic type corresponding to the received email message;
map accessing logic that identifies the function processing logic to be invoked by accessing a map that maps the traffic type to the function processing logic based on the traffic type corresponding to the email message; and
invocation logic that selectively invokes the identified function processing logic.

Example 18 is the computing system of any or all previous examples wherein the email transport infrastructure comprises:
a submission service computing system, and wherein a plurality of items of function processing logic are disposed on the submission service computing system and are selectively invoked based on the traffic type corresponding to the email message.

Example 19 is the computing system of any or all previous examples wherein the email transport infrastructure comprises:
a hub server computing system, and wherein a plurality of items of function processing logic are disposed on the submission service computing system and are selectively invoked based on the traffic type corresponding to the email message.

Example 20 is the computing system of any or all previous examples wherein the email transport infrastructure comprises:
a delivery service computing system, and wherein a plurality of items of function processing logic are disposed on the submission service computing system and are selectively invoked based on the traffic type corresponding to the email message.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
at least one processor; and
memory storing instructions executable by the at least one processor, wherein the instructions, when executed, configure the computing system to:
receive, through an electronic mail (email) transport infrastructure associated with the computing system, a first email message having recipient data that identifies a recipient user associated with the electronic message;
based on detecting that a traffic type of the first email message comprises an email traffic type, provide the first email message to an inbox associated with the recipient user in the computing system;

receive, through the email transport infrastructure, a second email message having recipient data that identifies the recipient user; and based on detecting that a traffic type of the second email message comprises a control flow message (CFM) traffic type, determine a CFM traffic subtype, from a plurality of CFM traffic subtypes, of the second email message, select one of a plurality of items of function processing logic that corresponds to the determined CFM traffic subtype based on mapping information that maps the plurality of CFM traffic subtypes to the plurality of items of function processing logic, wherein each item of function processing logic is configured to be conditionally invoked to perform a corresponding action in the computing system, and the selected item of function processing logic is configured to:

access a social graph corresponding to the recipient user, and modify information in the social graph based on the second email message, and selectively exclude the second email message from delivery to the inbox associated with the recipient user.

2. The computing system of claim 1 wherein the email transport infrastructure comprises simple mail transfer protocol (SMTP).

3. The computing system of claim 1 wherein the selected item of function processing logic is configured to:

control the inbox to perform the corresponding action on information in the inbox.

4. The computing system of claim 1, wherein the selected item of function processing logic is configured to:

identify a priority of the first email message in the inbox.

5. The computing system of claim 1, wherein the selected item of function processing logic is configured to:

control the inbox to store information in the inbox.

6. The computing system of claim 1, wherein the instructions configure the computing system to:

identify, after the first email message is delivered to the inbox, that the first email message has a spam signature, wherein, in response, the selected item of function processing logic is configured to control the inbox to move the first email message from the inbox to a trash folder.

7. The computing system of claim 1 wherein the email transport infrastructure comprises:

a submission service computing system, and wherein the plurality of items of function processing logic are disposed on the submission service computing system and are selectively invoked based on the traffic type corresponding to the second email message.

8. The computing system of claim 1 wherein the email transport infrastructure comprises:

a hub server computing system, and wherein the plurality of items of function processing logic are disposed on the hub server computing system and are selectively invoked based on the traffic type corresponding to the second email message.

9. The computing system of claim 1 wherein the email transport infrastructure comprises:

a delivery service computing system, and wherein the plurality of items of function processing logic are disposed on the delivery service computing system and are selectively invoked based on the traffic type corresponding to the second email message.

10. The computing system of claim 1, wherein the instructions configure the computing system to:

throttle transmission of the first and second email messages based on the detected traffic types corresponding to the first and second email messages.

11. A method performed by the computing system, the method comprising:

receiving, through an electronic mail (email) transport infrastructure, an email message having recipient data that identifies a recipient user associated with the email message;

detecting a control flow message (CFM) traffic type of the received email message;

based on detecting that the traffic type of the received email message comprises the CFM traffic type, accessing mapping information that maps the CFM traffic type to a corresponding item of function processing logic configured to be conditionally invoked to perform a function in the computing system;

selectively excluding the email message from delivery to an email inbox associated with the recipient user; and accessing, by the corresponding item of function processing logic, a social graph corresponding to the recipient user, and modifying information in the social graph based on the received email message.

12. The method of claim 11 and further comprising:

identifying a priority of the email message based on the detected traffic type.

13. The method of claim 11 wherein the email transport infrastructure comprises simple mail transfer protocol (SMTP), and the received electronic message that comprises the CFM traffic type is not delivered to the email inbox associated with the recipient user.

14. The method of claim 11 wherein performing the function relative to the email message comprises:

transferring user-specific information, other than email message information for email messages that are displayed to the user.

15. The method of claim 11, wherein controlling the email inbox to perform an action on information in the email inbox comprises:

identifying that another email message in the email inbox has a spam signature, after the other email message is delivered to the email inbox; and controlling the email inbox to move the other email message from the email inbox to a trash folder.

16. A computing system, comprising:

at least one processor; and memory storing instructions executable by the at least one processor, wherein the instructions, when executed, configure the computing system to provide:

traffic type identifier logic configured to:

determine that an email message, received in an email transport infrastructure, comprises a control flow message (CFM), the email message having recipient data that identifies a recipient user associated with the email message; and detect a traffic type of the CFM, of a plurality of different CFM traffic types;

map accessing logic configured to:

access mapping information that maps each traffic type, of the plurality of CFM traffic types, to a corresponding item of function processing logic, from a plurality of items of function processing logic,
    each item of function processing logic being configured to be conditionally invoked to perform a different function in the computing system; and
    based on the mapping information, select one of the items of function processing logic that corresponds to the detected traffic type; and
invocation logic configured to:
    exclude the email message from delivery to an email inbox associated with the recipient user; and
    selectively invoke the selected item of function processing logic, wherein the invoked item of function processing logic is configured to: access a social graph corresponding to the recipient user, transfer user-specific information, other than email message information for email messages in the email inbox associated with the recipient user, and
    modify the social graph based on the user-specific information.

17. The computing system of claim 16 wherein the email transport infrastructure comprises:
    a submission service computing system, and wherein the plurality of items of function processing logic are disposed on the submission service computing system and are selectively invoked based on the traffic type corresponding to the email message.

18. The computing system of claim 16 wherein the email transport infrastructure comprises:
    a hub server computing system, and wherein a plurality of items of function processing logic are disposed on the hub server computing system and are selectively invoked based on the traffic type corresponding to the email message; and
    a delivery service computing system, and wherein a plurality of items of function processing logic are disposed on the delivery service computing system and are selectively invoked based on the traffic type corresponding to the email message.

19. The computing system of claim 16 wherein the email transport infrastructure comprises simple mail transfer protocol (SMTP).

* * * * *